US012366104B2

(12) United States Patent
Corbani et al.

(10) Patent No.: US 12,366,104 B2
(45) Date of Patent: Jul. 22, 2025

(54) ADAPTIVE THRESHOLD FOR SLIDING DOORS

(71) Applicant: WINGECO SRL, Genoa (IT)

(72) Inventors: Marco Corbani, Genoa (IT); Alberto Malatesta, Genoa (IT); Andrea Appoloni, Recco (IT)

(73) Assignee: WINGECO SRL, Genoa (IT)

( * ) Notice: Subject to any disclaimer, the term of this patent is extended or adjusted under 35 U.S.C. 154(b) by 0 days.

(21) Appl. No.: 18/863,464

(22) PCT Filed: May 4, 2023

(86) PCT No.: PCT/IT2023/050117
§ 371 (c)(1),
(2) Date: Nov. 6, 2024

(87) PCT Pub. No.: WO2023/218490
PCT Pub. Date: Nov. 16, 2023

(65) Prior Publication Data
US 2025/0109626 A1 Apr. 3, 2025

(30) Foreign Application Priority Data
May 9, 2022 (IT) ........................ 102022000009491

(51) Int. Cl.
*E06B 1/70* (2006.01)

(52) U.S. Cl.
CPC ...................................... *E06B 1/70* (2013.01)

(58) Field of Classification Search
CPC . E06B 1/70; E06B 7/2316; E06B 7/18; E06B 7/205

(Continued)

(56) References Cited

U.S. PATENT DOCUMENTS 2,826,790 A * 3/1958 Forsythe .................. E06B 7/18 74/567
3,126,051 A * 3/1964 Sussin ....................... E06B 7/18 160/40

(Continued)

FOREIGN PATENT DOCUMENTS

JP 2015218494 A 12/2015
KR 101989553 B1 11/2018

OTHER PUBLICATIONS

International Search Report for International Application No. PCT/IT2023/050117.

(Continued)

*Primary Examiner* — Marcus Menezes
(74) *Attorney, Agent, or Firm* — Perilla Knox & Hildebrandt LLP; Kenneth A. Knox

(57) ABSTRACT

The patent consists of a flap which can be employed for covering the cavity corresponding to the lower profile of a sliding window when the sash opens. Said system subsequently allowing automatic withdrawal of said flap in a side-by-side position and not interfering with the sliding of said door during closing: said automatic withdrawal thus taking place in correspondence with the sliding in the opposite direction of the same door. This double synchronized movement with opening and closing of said sliding door favors the crossing of the threshold by users but above all by wheelchairs, trolleys, pushchairs and similar. The system object of the patent proposal is based on a mechanism controlled directly by the sliding of said sliding door which allows the automatic movement of said flap from a first horizontal position covering the frame track to a second lateral position next to the sliding door and vice versa.

20 Claims, 6 Drawing Sheets

(58) Field of Classification Search
USPC .................................................... 49/468, 469
See application file for complete search history.

(56) References Cited

U.S. PATENT DOCUMENTS

2008/0022599 A1* 1/2008 Fischer .................... E06B 1/70
49/468
2010/0064590 A1 3/2010 Jones et al.

OTHER PUBLICATIONS

Written Opinion for International Application No. PCT/IT2023/050117.

* cited by examiner

ADAPTIVE THRESHOLD FOR SLIDING DOORS

CROSS-REFERENCE TO RELATED APPLICATIONS

This application is a national phase application under 35 U.S.C. 371 of International Application No. PCT/IT2023/050117 filed May 4, 2023, entitled “Adaptive Threshold for Sliding Doors,” which claims the benefit of and priority to Italian Patent Application No. 102022000009491 filed May 9, 2022.

TECHNICAL FIELD

The present disclosure relates to the window and door product sector and particularly to systems and devices which are used to eliminate and/or mitigate architectural barriers and/or limitations to the usability and ease of use of a door or window.

BACKGROUND

Generally, sliding door assemblies comprise a sliding door panel which, guided longitudinally, slides parallel to a vertical wall between two extreme and opposite opening positions. Rotating members or support trolleys are usually fixed to the panel, which are then engaged in a sliding rail and support the weight of the panel as well as allowing it to move. On the side opposite to that of the support trolleys there are usually guide members, one part of which is fixed to the wall or floor and one part of which is fixed to the panel, the guide members allow the panel to remain in its vertical plane parallel to the wall vertical itself.

In view of the aforementioned configuration of a purely scholastic nature but reported for explanatory and non-limiting purposes only, the sliding doors have over time been subject to a gradual technical evolution which has progressively increased their structural complexity in particular by adding various thermal sealing systems rather than sealing against atmospheric agents such as air, water or wind and, furthermore, numerous automatisms have been developed which regulate automatic opening and closing.

Parallel to this technological evolution, also from a legislative point of view, there has been an evolution of the regulations concerning the fixtures and determining their types and construction constraints; these modalities pertaining not only to strictly technical requirements but also to employment directives concerning the so-called architectural barriers.

Given the aforementioned technical and regulatory evolution, the presence of a rail in this type of sliding door and window implies problems both in terms of resistance to atmospheric agents and in terms of the usability of the window itself and particularly by people with disabilities; especially by those who move or ambulate using aids such as wheelchairs or trolleys equipped with wheels. In these circumstances, the presence of a rail makes it inconvenient to cross the threshold, this inconvenience being particularly accentuated in the case of devices equipped with small wheels (typically directional) which can, in the worst case, get stuck In the cavity of the rail, causing not only inconvenience but also danger to people’s safety.

Furthermore, the problem mentioned primarily and dutifully for disabled people also constitutes an inconvenience, albeit manageable, in the event that the window threshold is crossed by able-bodied people who move wheel-based devices such as, by way of nonlimiting example, strollers for children rather than trolley or carts.

Over time, various solutions have been developed and proposed which can be applied to a sliding window in order to facilitate crossing the threshold; the solutions typically focusing on accessory ramps and slides used to go beyond the track of the frame.

Some solutions are based on automatisms, slides, or accessory ramps, and include autonomous elements typically applied near the window and used when necessary or permanently by activating them separately. The actuation is piloted by way of a specific command, be it mechanical or electronic or by way of the handle of the window which allows, depending on how it is moved, to activate the slides rather than being traditionally used for opening and closing the window.

The use of accessory aid systems such as ramps and slides currently used to cover the sliding track of a sliding door Is certainly positive but still presents various Inconveniences, first of all the fact of requiring a multiplicity of separate operations with respect to the frame (opening/closing with separate activation of the aid); the drives having to be activated and coordinated by the user for their correct functioning and synchronism.

This peculiarity implies difficulty of use by people with reduced mobility but also by able-bodied people who are simply not used to operating sliding doors subject to multiple operations and to be coordinated, under penalty of blockages or malfunctions or jams, etc. Furthermore, the sliding doors of new conception and production that aim at the removal of architectural barriers naturally and understandably evolve towards automatic operation (for example with the aid of built-in motors) so that the coordination of a plurality of automatisms pertaining to different problems it can cause coordination and mechanical synchronization problems between different elements and drives. In particular, it must be kept in mind that the necessary and understandable desire to cover the sliding track of a door in order to facilitate crossing the threshold must not affect the necessary sliding dynamics of the door with respect to the track or its resistance to atmospheric agents (if anything strengthen these aspects) and should further coordinate in a timely, reliable and synchronized manner with the common opening and closing operations of the window with good repeatability and reliability of the closure and without increasing the complexity of use of the window.

Finally, it should be noted that the solutions currently on the market are difficult to standardize or at least scalable and adaptable since they require a rather Invasive adaptation of the window with modifications involving several elements: not only the track to be covered but often also the mobile leaf or the profiles or the drives. This resulting in devices that are scarcely usable as remedies for existing doors and have a significant impact also for their insertion (ad hoc with appropriate design and modifications) in newly built doors. The proposed patent achieves the aforementioned objectives through a system with an adaptive threshold in the form of a flap that allows the cavity corresponding to the lower profile of a sliding window to be covered in correspondence with the opening of the sash. The system subsequently allowing automatic withdrawal of the flap in a side-by-side position and not interfering with the sliding of the door during closing; the automatic withdrawal thus taking place in correspondence with the sliding in the opposite direction of the same door. This double synchronized movement with opening and closing of the sliding door favors the crossing of the threshold by users but above all by wheelchairs, trolleys, pushchairs and similar solutions.

The system referred to in the proposed patent being based on a leverage driven directly by the sliding of the sliding sash which allows automatic movement of the flap from a first horizontal position covering the rail of the frame to a second lateral position alongside the sash sliding, the second position allowing the sash to slide adequately and synchronously along the track when the window Is closed. The flap being subsequently able to return by gravity to the position of cover of the track following the opening of the window, i.e. if the sliding sash returns to its fully open position. The movements of passage from the first cover position of the track to the second sliding position of the sash in the closing phase and vice versa being synchronized by way of a striker anchored to the sliding sash which in its opening and closing movement of the sash determines whether or not this leverage is energized. The leverage being based on a telescopic mechanism which converts the kinetic energy produced by the advancement of the sash in the closing phase into a vertical movement of a thrust pin which lifts the flap and determines its overturning from the horizontal position covering the track to an oblique and lateral position to the leaf (in favor of gravity for the subsequent return); the position easily and synchronously allowing the sliding of the leaf towards the completely closed position.

Both of these synchronized movements of sash opening with the flap falling by gravity and of sash closing with lifting of the flap in a retracted position and not interfering with lateral sliding, being connected only to the dynamics of movement of the sliding sash regardless of the propulsive and drive modes of the same: both a manual push by a user, and the electromechanical operation of a possible automation system.

BRIEF SUMMARY

The present disclosure intends to overcome the critical points set out above by way of an additional threshold which can be folded down if necessary and which can be conveniently used for covering/closing the lower cavity which characterizes the frames. The folding threshold operating synchronously with the normal opening and closing of the window and as a result of these actions causing the closure of the cavity to facilitate passage or the overturning/opening of the threshold in a suitable position, not interfering with the sliding of the sash. A further purpose of the patent is to create a system which does not require separate drives and whose operation is controlled automatically and solely as a function of the movement of the sliding leaf only; the operation being therefore transparent to the user since it is included in that typical of a sliding window and native to common sliding doors (handle rather than single button in the case of motorized openings). Another purpose of this patent is to create a folding threshold which does not require dedicated and additional dynamic contributions to operate but exploits the natural dynamism and mechanical energy deriving from the natural translational motion of opening and closing of the sliding door for its operation. A further purpose of the present patent is to create a folding threshold which can be easily used for newly built doors and without invasive modifications but above all which can be used for existing doors and above all does not require significant modifications to the traditional structures, this allowing it to be applied as additional element and with minimal adaptations to all the sliding doors on the market and, furthermore, It adapts to the different types of installation envisaged for these fixtures (recessed, flush, with raised flooring, etc.). In particular, we want the proposed solution to comply with current regulations concerning architectural barriers (voids, spaces, steps, obstacles, etc.).

The proposed patent achieves the aforementioned objectives through a system with an adaptive threshold in the form of a flap that allows the cavity corresponding to the lower profile of a sliding window to be covered In correspondence with the opening of the sash.

The system subsequently allowing automatic withdrawal of the flap in a side-by-side position and not interfering with the sliding of the door during closing; the automatic withdrawal thus taking place in correspondence with the sliding in the opposite direction of the same door. This double synchronized movement with opening and closing of the sliding door favors the crossing of the threshold by users but above all by wheelchairs, trolleys, pushchairs and similar. The system referred to in the proposed patent being based on a leverage driven directly by the sliding of the sliding sash which allows automatic movement of the flap from a first horizontal position covering the rail of the frame to a second lateral position alongside the sash sliding, the second position allowing the sash to slide adequately and synchronously along the track when the window is closed. The flap being subsequently able to return by gravity to the position of cover of the track following the opening of the window, if the sliding sash returns to its fully open position. The movements of passage from the first cover position of the track to the second sliding position of the sash In the closing phase and vice versa being synchronized by way of a striker anchored to the sliding sash which in Its opening and closing movement of the sash determines whether or not this leverage is energized. The leverage being based on a telescopic mechanism which converts the kinetic energy produced by the advancement of the sash in the closing phase into a vertical movement of a thrust pin which lifts the flap and determines its overturning from the horizontal position covering the track to an oblique and lateral position to the leaf (in favor of gravity for the subsequent return): the position easily and synchronously allowing the sliding of the leaf towards the completely closed position.

Both of these synchronized movements of sash opening with the flap falling by gravity and of sash closing with lifting of the flap in a retracted position and not interfering with lateral sliding, being connected only to the dynamics of movement of the sliding sash regardless of the propulsive and drive modes of the same: both a manual push by a user, and the electromechanical operation of a possible automation system.

BRIEF DESCRIPTION OF THE FIGURES

Further characteristics and advantages of the proposed technical solution will be more evident in the following description of a single, but not exclusive, embodiment, represented, by way of non-limiting example, in the attached tables of drawings wherein.

Figure 1:
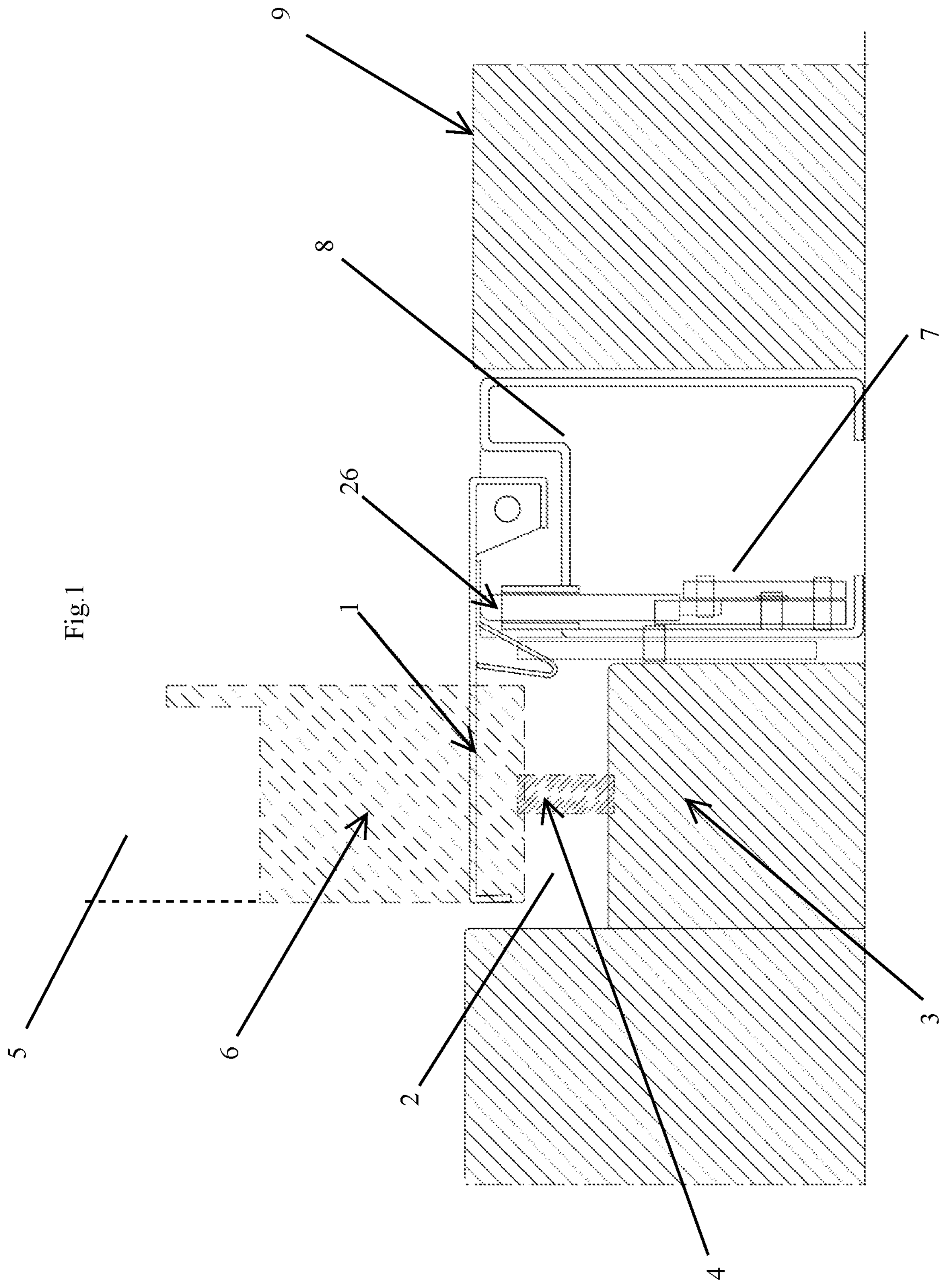
FIG. 1 and FIG. 2 show in section and side view the elements of the system represented in equilibrium configuration with system at rest, horizontal flap and open sliding door.
Figure 2:
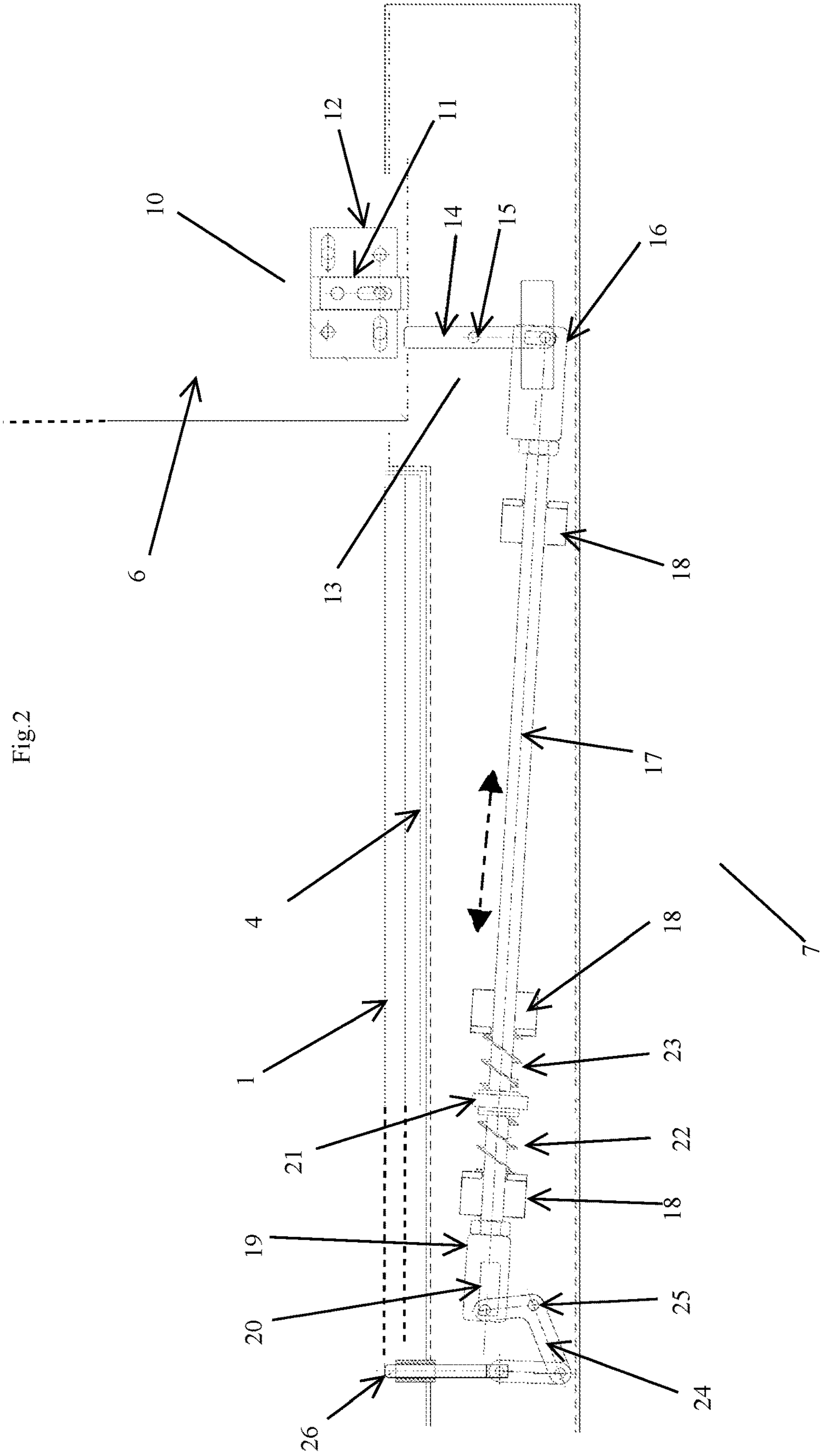
Figure 3:
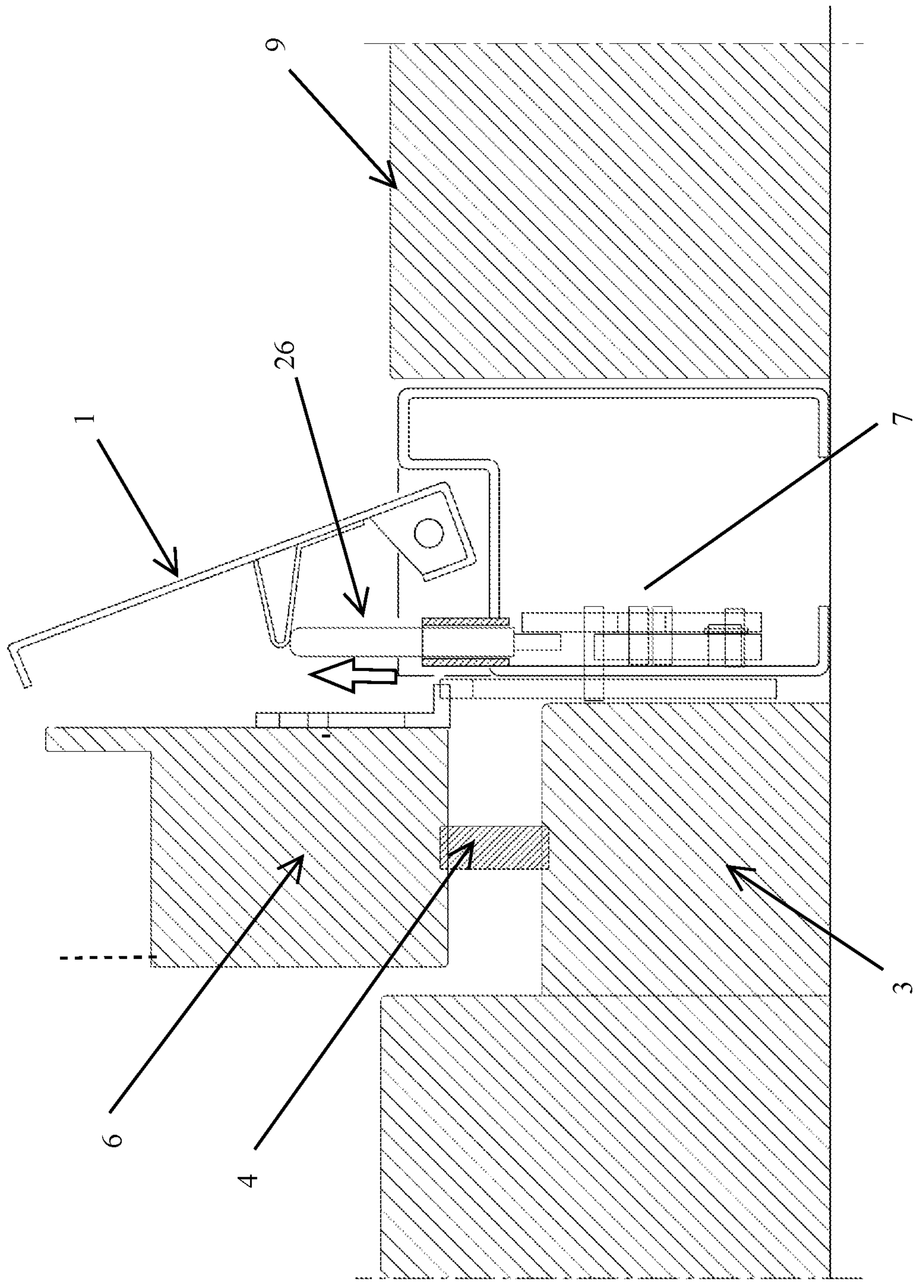
FIG. 3 and FIG. 4 are sectional and side views of the elements of the system shown during closing of the door with corresponding tilting of the flap into a position favorable for sliding of the door.
Figure 4:
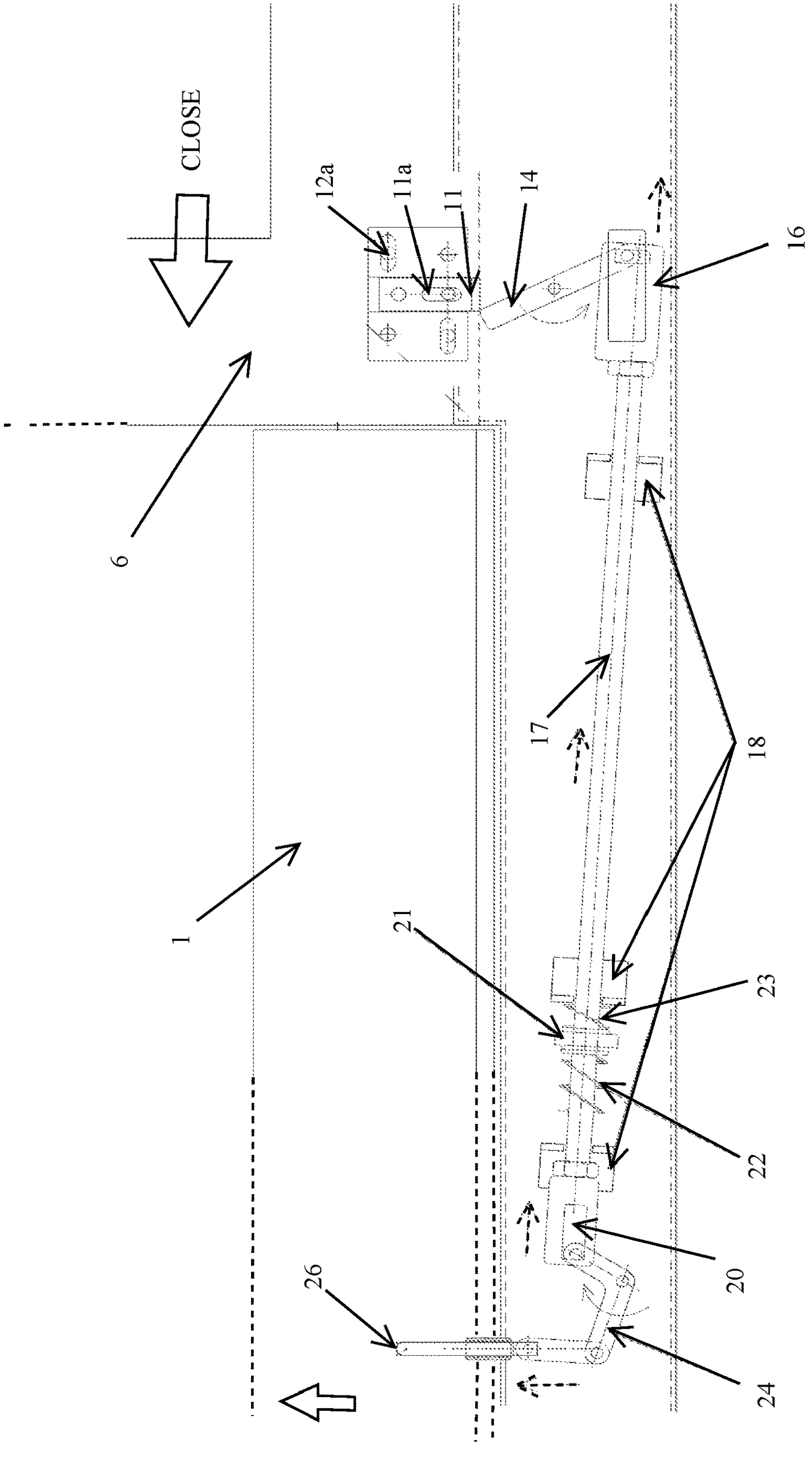
Figure 5:
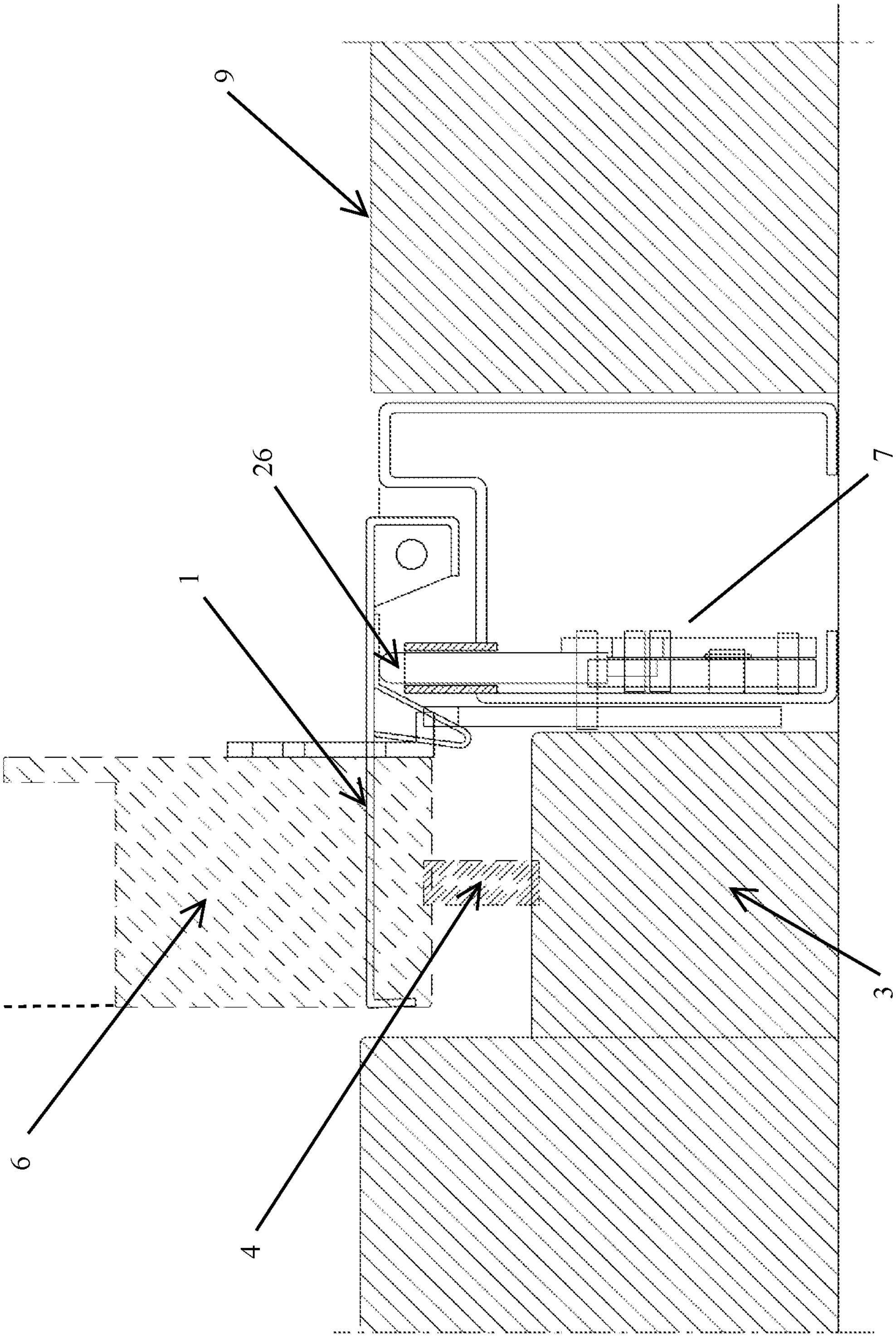
FIG. 5 and FIG. 6 represent in-section and inside view the elements of the system during the opening of the door with the corresponding fall of the flap due to gravity.
Figure 6:
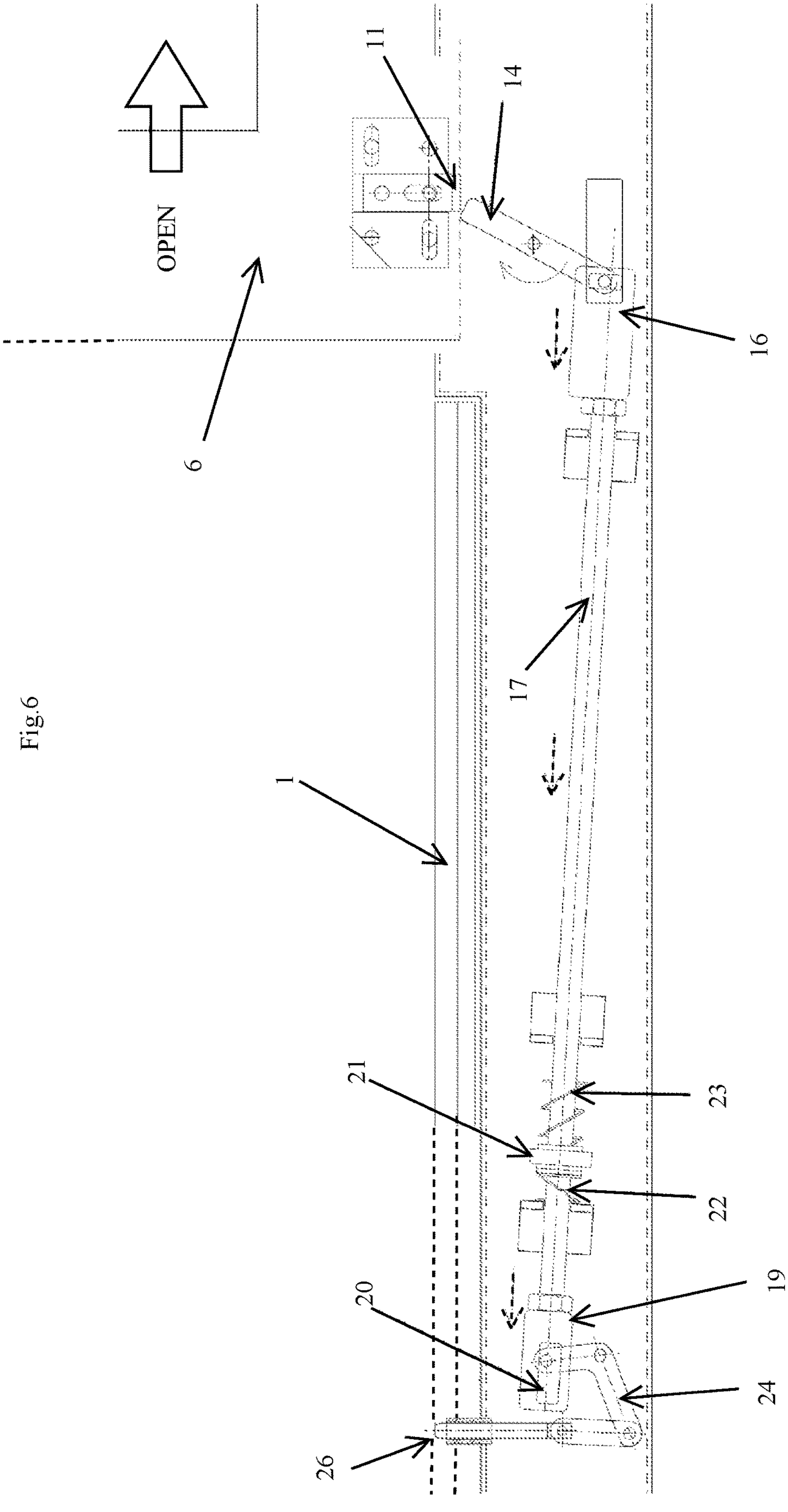

It should be noted that the aforementioned attached figures illustrate only some possible embodiments of the system, in order to better understand the advantages and characteristics described. These embodiments are therefore to be understood as purely illustrative and not limiting to the inventive concepts for which protection is requested.

DETAILED DESCRIPTION

With reference to the attached drawings, the adaptive threshold system for sliding doors according to the disclosure is shown.

The system comprising a flap (1) used to cover the cavity (2) of the lower profile (3) with track (4) of a sliding door (5); the profile with track being used to guide and facilitate the sliding of at least one sliding door (6) capable of moving between an opening (OPEN) and a closed (CLOSE) position. The folding flap (1) being operated by leverage means (7) contained in a unit (8) having a shape optionally similar to the lower profile (3) of the sliding door (5) and applicable contiguously to the same and, if necessary, recessed with respect to at floor level (9); the leverage (7) being actuated and piloted by the translation motion of the leaf (6) during the common opening (OPEN) and closing (CLOSE) operations of the sliding door (5). The system allowing to close by gravity and automatically the flap (1) on the profile (3) with rail (4) during the opening of the door (6) and to tilt the flap (1) by means of a pin (26) in when closing the leaf (6) in order to avoid obstructing the sliding of the leaf. The flap (1) closing on the profile (3) and therefore on the cavity (2) containing the track (4) of the sliding door (5) by simple gravity and overturning in an adjacent and lateral position (therefore not interfering) if the sliding door (6) slides on the track (4) In the act of closing the sliding door (5) and regardless of how this closure is determined (manually or motorized). The synchronism being determined as anticipated by a suitable leverage (7) which allows during the closing phase of the sliding door (5) to convert the kinetic energy of the leaf (6) into a mechanical impulse which overturns the flap and places it in a position side and alongside the sliding door (6). The leverage (7) then allowing the gravity fall of the flap (1) if the sliding door (6) returns to an open position. The leverage (7) comprising:

1. An accessory element (10) made integral with the sliding door (6) and used to exploit the translational motion of the door (6) and transfer it to the actuation mechanism of the flap (1). The accessory element (10) comprising a contact hook (11) adjustable in height (11*a*) integral with a plate (12) for hooking to the door (6), the plate (12) being equipped with left and right adjustment means (12*a*). These adjustments being useful not only to facilitate the application of the system on existing leaves but also to regulate the excitation of the overall system by the sliding leaf (hook point, intensity of the impulse generated on contact).
2. An element (13) for converting translational motion into rotary motion consisting of a transfer lever (14) normally In a vertical position and capable of rotating around a central fulcrum (15): the lever (14) being used to intercept the motion of the contact hook (11) and converting the translational motion of the leaf (6) into a rotary motion used to operate the remaining part of the leverage (7). This transfer between the leaf (6) and the leverage (7) taking place in both directions of the translational motion of the leaf (6) as It slides along the track (4):
   during the closing phase of the sliding leaf when there is an anti-clockwise rotation of the transfer lever (14) with respect to the fulcrum (15).
   during the opening phase of the sliding leaf (6) when there is a clockwise rotary movement of the lever (14) with respect to the fulcrum (15).
3. A motion converter of the crank rod type (16) connected to the transfer lever (14) and further to an axle (17) supported by suitable brackets (18); the axle (17) being capable of sliding within the brackets (18) and moving left to right and vice versa in correspondence with the movement of the connecting rod converter. The crank rod converter (16) being used to convert the clockwise and counterclockwise rotary motion of the transfer lever (14) into a translational thrust and traction motion of the axle (17) respectively. The axle (17) comprising at its opposite end (opposite to the crank connecting rod converter) a connection terminal (19) with the remaining part of the leverage; the connection terminal (19) being characterized by a slot (20).
4. A bush (21) keyed on the axle of movement (17) and on the sides of which there are two springs (22), (23): the springs and the keyed bushing (21) being positioned between two of the axle (17) support brackets (18) so that, as a result of the aforementioned opposite thrust and traction movements of the axle, a first spring (22) goes respectively to compress and the second spring (23) to expand (and vice versa). This alternating and reversible compression and rest mechanism of the springs (22), (23) taking place in correspondence with each of the two directions of translational motion of the axle (17) and thus causing each of the movements (dx sx and vice versa) a reaction contrary to the translation motion of the axis axle (17) which tends, In the absence of the stimulus provided by the sliding of the leaf, to bring the overall mechanical system back towards a point of equilibrium. The stimulus being limited in time since it is limited by the short contact time between the contact hook (11) and the transfer lever (14) during the opening and closing phases of the sliding leaf. The system of springs (22), (23) in push-pull proving particularly useful for restoring the balance of the system whenever the stimulus that the opening or closing of the leaf (6) produces on the leverage (7) ceases.
5. A so-called boomerang connecting rod (24) hinged to a fulcrum (25) and connected at one end to the slot (20) of the terminal (19) and connected to its other end to a thrust pin (26) vertical; the boomerang connecting rod (24) being able to rotate with respect to the fulcrum (25) when solicited by a traction movement of the axle and due to the effect of this rotation and its specific shape, lift the pin (26) upwards by push; this impulsive movement (of the duration of the brief stimulus originally imposed by the dragging of the door (6) on the transfer lever (14) causing the impulsive lifting of the pin (26) and the overturning of the flap (1) in an upright position and alongside the sliding door (6) in a position that does not interfere with the sliding of the door.

As a consequence of the structure described above, the operation of the device can easily be traced back to two states of equilibrium:

Flap (1) lowered to cover the cavity (2) containing the rail (4) in order to facilitate the crossing of the threshold; this condition occurs when the sliding door (5) is fully opened;

Flap (1) in vertical position of stable balance and more precisely in a position alongside the leaf (6) during its sliding during the closing and opening phase of the sliding door (5) or when the leaf (6) is at slide in the portion of the track (4) intended to be covered by the flap (1).

Furthermore, the device according to the proposed patent is characterized by two transition moments between the equilibrium states:

The flap (1) falls due to gravity when the sliding door (5) is fully opened;

The flap (1) is lifted by the thrust pin (26) by means of the leverage (7) by the closing action of the sliding leaf (6) and, particularly, in correspondence with the counterclockwise actuation of the transfer lever (14) when the contact hook (11) integral with the sliding door (6) intercepts the transfer lever (14) during the closing phase of the sliding door (5).

Finally, with reference to the overall functioning of the system, it should be noted that while the closing motion of the sliding leaf (6) produces the lifting of the pin (26), the closing motion does not generate thrust (which would be harmful to the system) but rather favors the repositioning in a lowered and non-interfering position of the pin (26) itself.

This happens because the traction phase of the axle (17) consequent to the counterclockwise rotation of the transfer lever (14) takes place in a direct kinematic chain, with Immediate passage of the thrust to the pin (26) while the expansion phase consequent to the clockwise rotation Di the lever (14) is attenuated by the sliding of the terminal (19) with respect to the boomerang connecting rod (24) thanks to the presence of the slot (20).

The sliding preventing the transfer of motion to the pin (26). The slot (20) and in particular its length being therefore sized to obtain this effect and not actuate the pin (26) which on the contrary can return to its withdrawn position due to the effect of the aforementioned springs (22), (23) which, as mentioned, have the system in equilibrium when any excitation received by the leverage (7) ceases in both directions, both during the opening and during the closing of the sliding door (5).

The proposed device can be applied to a particularly widespread and well-known type of door or window frame, such as the so-called sliding doors, and consists of a folding threshold which can be conveniently used to close the lower cavity which often characterizes the window frames. The aid is particularly advantageous for facilitating the passage of devices and vehicles equipped with wheels: primarily and mainly wheelchairs for the disabled but also pushchairs, trolleys, transport trolleys and similar. The folding threshold system is usable in the window and door market both as an improvement that can be integrated into newly constructed sliding doors and as a remedy for existing and traditionally shaped doors.

While the disclosure is suggestible to various modifications and alternative constructions, some embodiments have been shown in the drawings and described in detail in the preceding paragraph. It is to be understood, however, that there is no intention to limit the disclosure to the specific embodiment illustrated, but, on the contrary, it is intended to cover all modifications, alternative constructions, and equivalents which fall within the scope of the disclosure such as defined in the attached claims.

Use of "for example", "etc.", "or" "preferably" indicates non-exclusive alternatives without limitation unless otherwise indicated.

In particular, the disclosure may be implemented with technical equivalents, with supplementary materials or devices suitable for the purpose and the field of application. Conformation and sizing of the constituent parts and of the products made to implement the solution the solution may vary in an appropriate manner, but consistent with the proposed solution.

By way of non-limiting example, it should be noted that the dimensions, geometric shapes of the parts involved, their reciprocal positioning and the specific shape and some functions of the system may be further varied: the general layout may in fact be revisited without leaving the ambit of the claimed patent depending on the type of installation and window, the adaptations being required by the field of application and reasonably not available and not even foreseeable at the time of writing of this patent application but nevertheless easily achievable according to the prior art In any case, the necessary modifications to the system object of the disclosure and to its characterizing parts, inclusive of adjustments and sizing suitable for the single installation, will be deducible by an adequately trained technician in the sector and without leaving the scope of protection of the claimed patent. Furthermore, the system can be adapted and possibly expanded to provide further and additional services and further equipped with systems and accessories to integrate its operation and increase its potential and areas of use such as for example remote control systems and automatic or motorized activation

The invention claimed is:

1. An adaptive threshold for a sliding door, comprising:

at least one sliding leaf, the at least one sliding leaf configured to pass from an open position to a closed position by sliding along a track housed in a lower profile of the sliding door, a flap configured to pass from a first horizontal position covering the track to a second lateral and inclined position alongside the at least one sliding leaf, wherein the flap is configured to return, by gravity, to the first horizontal position, wherein the flap is guided by movement of the at least one sliding leaf by a leverage assembly housed within a unit applied to a side of the lower profile, wherein the leverage assembly comprises:

at least one contact hook anchored to a lower part of the at least one sliding leaf and dragged during movement from the open position to the closed position;

a translatory motion into rotational motion converter configured to intercept motion of the at least one contact hook and transfer it to a crank connecting rod converter;

an axle provided at an end with a connection terminal comprising a slot, wherein the axle is connected to the crank connecting rod converter, and is configured to slide along at least two support brackets;

a bush provided with lateral return springs, the bush being keyed on the axle in an intermediate position between the at least two support brackets; and a boomerang connecting rod connected at its first end with the slot and at its second end with a pin; wherein the pin is positioned at rest under a seat of the flap when the flap is arranged horizontally.

2. The adaptive threshold according to claim 1, wherein the crank connecting rod converter determines a traction pulse on the axle when the at least one sliding leaf slides towards the closed position.

3. The adaptive threshold according to claim 1, wherein the crank connecting rod converter determines a thrust pulse on the axle when the at least one sliding leaf slides towards the open position.

4. The adaptive threshold according to claim 1, wherein the boomerang connecting rod rotates about a fulcrum and vertically lifts the pin when the axle is subjected to traction.

5. The adaptive threshold according to claim 1, wherein the first end of the boomerang connecting rod slides within the slot when the axle is pushed.

6. The adaptive threshold according to claim 1, wherein the contact hook is anchored to the lower part of the at least one sliding leaf using a plate equipped with vertical adjustment means and horizontal adjustment means.

7. The adaptive threshold according to claim 1, wherein the translational to rotational motion converter includes a lever pivotable about a fulcrum.

8. The adaptive threshold according to claim 1, wherein the flap is formed of a material selected from a group consisting of metal, plastic, composite, and combinations thereof.

9. The adaptive threshold according to claim 1, wherein the unit housing the leverage assembly is recessed with respect to floor level.

10. The adaptive threshold according to claim 1, wherein the at least one sliding leaf is motorized.

11. A method for operating an adaptive threshold for a sliding door, the method comprising:

providing a sliding door with at least one sliding leaf configured to pass from an open position to a closed position by sliding along a track housed in a lower profile of the sliding door;

providing a flap configured to pass from a first horizontal position covering the track to a second lateral and inclined position alongside the at least one sliding leaf, wherein the flap is configured to return, by gravity, to the first horizontal position; and guiding the flap by movement of the at least one sliding leaf using a leverage assembly housed within a unit applied to a side of the lower profile, wherein the leverage assembly comprises:

at least one contact hook anchored to a lower part of the at least one sliding leaf and dragged during movements from the open position to the closed position;

a translatory motion into rotational motion converter configured to intercept motion of the at least one contact hook and transfer it to a crank connecting rod converter;

an axle provided at an end with a connection terminal comprising a slot, wherein the axle is connected to the crank connecting rod converter, and is configured to slide along at least two support brackets;

a bush provided with lateral return springs, the bush being keyed on the axle in an intermediate position between the at least two support brackets; and a boomerang connecting rod connected at its first end with the slot and at its second end with a pin, wherein the pin is positioned at rest under a seat of the flap when the flap is arranged horizontally.

12. The method according to claim 11, wherein the crank connecting rod converter determines a traction pulse on the axle when the at least one sliding leaf slides towards the closed position.

13. The method according to claim 11, wherein the crank connecting rod converter determines a thrust pulse on the axle when the at least one sliding leaf slides towards the open position.

14. The method according to claim 11, wherein the boomerang connecting rod rotates about a fulcrum and vertically lifts the pin when the axle is subjected to traction.

15. The method according to claim 11, wherein the first end of the boomerang connecting rod slides within the slot when the axle is pushed.

16. The method according to claim 11, wherein the contact hook is anchored to the lower part of the at least one sliding leaf using a plate equipped with vertical adjustment means and horizontal adjustment means.

17. The method according to claim 11, wherein the translational to rotational motion converter includes a lever pivotable about a fulcrum.

18. A system for an adaptive threshold of a sliding door, comprising:

a sliding door assembly comprising at least one sliding leaf configured to move between an open position and a closed position along a track housed in a lower profile;

a movable flap configured to transition between a first position covering the track and a second position adjacent to the at least one sliding leaf; and a leverage mechanism disposed within a housing unit attached to the lower profile, the leverage mechanism comprising:

a contact element coupled to the at least one sliding leaf;

a motion conversion assembly configured to convert translational motion of the contact element to rotational motion;

an axial member slidably supported by a plurality of brackets, the axial member having an end portion with a slotted terminal;

a resilient assembly comprising a bushing mounted on the axial member between at least two of the plurality of brackets, the resilient assembly further comprising biasing elements positioned laterally relative to the bushing; and an actuating linkage having a first portion engaged with the slotted terminal and a second portion coupled to a lifting member, wherein the lifting member is positioned to engage the movable flap.

19. The system of claim 18, wherein the motion conversion assembly comprises a pivotable lever configured to interact with the contact element and transfer motion to a crank mechanism coupled to the axial member.

20. The system of claim 18, wherein the movable flap is configured to return to the first position by gravitational force when the at least one sliding leaf is in the open position, and wherein the leverage mechanism is configured to move the movable flap to the second position in response to the at least one sliding leaf moving towards the closed position.

* * * * *